(12) United States Patent
Wang et al.

(10) Patent No.: US 11,868,783 B2
(45) Date of Patent: Jan. 9, 2024

(54) METHOD OF UNDERLYING DRIVE FORWARDING AND MULTI-CORE SYSTEM IMPLEMENTED BASED ON UEFI

(71) Applicant: CHANGXIN MEMORY TECHNOLOGIES, INC., Hefei (CN)

(72) Inventors: Yang Wang, Hefei (CN); Dan Lu, Hefei (CN); Hao He, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 219 days.

(21) Appl. No.: 17/411,215

(22) Filed: Aug. 25, 2021

(65) Prior Publication Data

US 2021/0382723 A1  Dec. 9, 2021

Related U.S. Application Data

(63) Continuation of application No. PCT/CN2021/086464, filed on Apr. 12, 2021.

(30) Foreign Application Priority Data

Apr. 16, 2020 (CN) .................. 202010299815.X

(51) Int. Cl.
*G06F 9/4401* (2018.01)
*G06F 9/451* (2018.01)

(52) U.S. Cl.
CPC ............ *G06F 9/4401* (2013.01); *G06F 9/451* (2018.02)

(58) Field of Classification Search
CPC ....................................................... G06F 9/04
See application file for complete search history.

(56) References Cited

U.S. PATENT DOCUMENTS

2002/0120632 A1\* 8/2002 Gremmert ............... G06F 16/29
2005/0193245 A1\* 9/2005 Hayden ............... G06F 11/2069
714/13
(Continued)

FOREIGN PATENT DOCUMENTS

CN        104283892 A    1/2015
CN        104598278 A    5/2015
(Continued)

OTHER PUBLICATIONS

ISR for International Application PCT/CN202/1086464 mailed Jul. 14, 2021.
(Continued)

*Primary Examiner* — Paul Yen
(74) *Attorney, Agent, or Firm* — Ladas & Parry LLP

(57) ABSTRACT

Disclosed are a method of underlying drive forwarding and a multi-core system implemented based on a UEFI, which can increase a running speed of the multi-core system implemented based on a UEFI. The underlying drive forwarding method is configured for underlying drive forwarding of a multi-core system. The multi-core system is implemented based on a UEFI and includes an application processor and a bootstrap processor. The bootstrap processor is provided with an execution interface configured to call underlying hardware. The application processor is configured with an instruction interface corresponding to the execution interface. The underlying drive forwarding method includes the following steps: receiving, by the instruction interface, an operation instruction, generating a request according to the operation instruction, and sending the request to the bootstrap processor; and driving, by the bootstrap processor according to the request, the execution interface corresponding to the instruction interface to execute a corresponding operation.

12 Claims, 1 Drawing Sheet

(56) References Cited

U.S. PATENT DOCUMENTS

2013/0305251 A1 11/2013 Yamauchi et al.
2019/0236280 A1* 8/2019 Sheng .................. G06F 9/4401

FOREIGN PATENT DOCUMENTS

| CN | 103282854 B | 8/2016 |
| CN | 103197959 B | 3/2017 |
| CN | 110659221 A | 1/2020 |

OTHER PUBLICATIONS

English translation of Written Opinion of the International Search Authority in the international application No. PCT/ CN2021/ 086464, dated Jul. 14, 2021.

* cited by examiner

METHOD OF UNDERLYING DRIVE FORWARDING AND MULTI-CORE SYSTEM IMPLEMENTED BASED ON UEFI

CROSS-REFERENCE TO RELATED APPLICATIONS

This application is a continuation of International Patent Application No. PCT/CN2021/086464, filed on Apr. 12, 2021, which claims priority to Chinese Patent Application No. 202010299815.X, filed on Apr. 16, 2020. The disclosures of the aforementioned patent application are incorporated herein by reference.

TECHNICAL FIELD

The present application relates to the field of multi-core systems implemented based on a UEFI, and in particular, to a method of underlying drive forwarding and a multi-core system implemented based on a UEFI.

BACKGROUND

A UEFI (Unified Extensible Firmware Interface) is configured to define a software interface between an operating system and system firmware, and is a proposed standard for architectures, interfaces and services of PC firmware. A multi-core system implemented based on a UEFI is a UEFI-based bootstrap system based on a UEFI mainboard. The multi-core system implemented based on a UEFI has gradually become a mainstream system of CPU core architectures due to its interface and good interactive experience compared with a conventional BIOS.

However, the multi-core system implemented based on a UEFI has many limitations on implementation and application of a multi-core processor, which leads to limited functionality and operation capability of the processor and cannot meet increasingly developing computing needs.

SUMMARY

The present application provides a method of underlying drive forwarding and a multi-core system implemented based on a UEFI, which can increase a running speed of the multi-core system implemented based on a UEFI.

In order to solve the above problem, a method of underlying drive forwarding is provided below, for underlying drive forwarding of a multi-core system, the multi-core system being implemented based on a UEFI and including an application processor and a bootstrap processor, the bootstrap processor being provided with an execution interface configured to call underlying hardware, and the application processor being configured with an instruction interface corresponding to the execution interface, the underlying drive forwarding method including the following steps: receiving, by the instruction interface, an operation instruction, generating a request according to the operation instruction, and sending the request to the bootstrap processor; and driving, by the bootstrap processor according to the request, the execution interface corresponding to the instruction interface to execute a corresponding operation.

In order to solve the above problem, a multi-core system implemented based on a UEFI is further provided below, including: a bootstrap processor including a request receiving management module and execution interfaces configured to call underlying hardware; and an application processor connected to the bootstrap processor, including an instruction interface corresponding to the execution interface and a request source management module interacting with the request receiving management module; the instruction interface being configured to receive an operation instruction transmitted to the application processor and generate a request according to the operation instruction, the request source management module being configured to forward the request to the request receiving management module, and the bootstrap processor being configured to call, in response to the request received by the request receiving management module, the execution interface corresponding to the instruction interface to execute a corresponding operation.

DESCRIPTION OF EMBODIMENTS

It is found that a UEFI (Unified Extensible Firmware Interface) system has limited operation capability because the multi-core system implemented based on a UEFI has many limitations on support for multiple cores in a processor and underlying drive does not support multi-core call. Moreover, since the implementation of the multi-core system implemented based on a UEFI has been solidified in a system storage medium, multiple cores cannot be reconstructed by modifying the multi-core system implemented based on a UEFI.

In the multi-core system implemented based on a UEFI, a core responsible for system initialization and drive call is referred to as a bootstrap processor (BSP), and other cores are an application processor (AP). The application processor, when executing a drive request, is limited by the request and functionality, does not have the capability to access the underlying hardware. This limits the capability of the application processor to access the hardware. As a result, the application processor can only be configured for simple logical calculations, which limits the running speed of the multi-core system implemented based on a UEFI.

To enable the objectives, technical means and effects of the present application to be clearer, the present application is further elaborated below with reference to the accompanying drawings. It should be understood that embodiments described herein are only some rather than all of the embodiments of the present application, and are not intended to limit the present application. All other embodiments obtained by those skilled in the art based on the embodiments in the present application without creative efforts fall within the protection scope of the present application.

Figure 1:
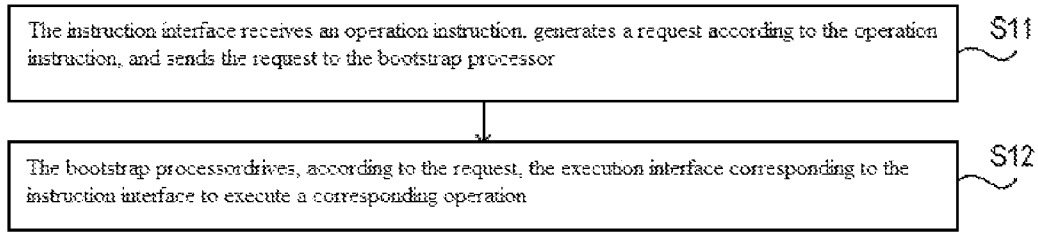
FIG. 1 is a schematic flowchart of steps of a method of underlying drive forwarding according to an embodiment of the present application.
Figure 2:
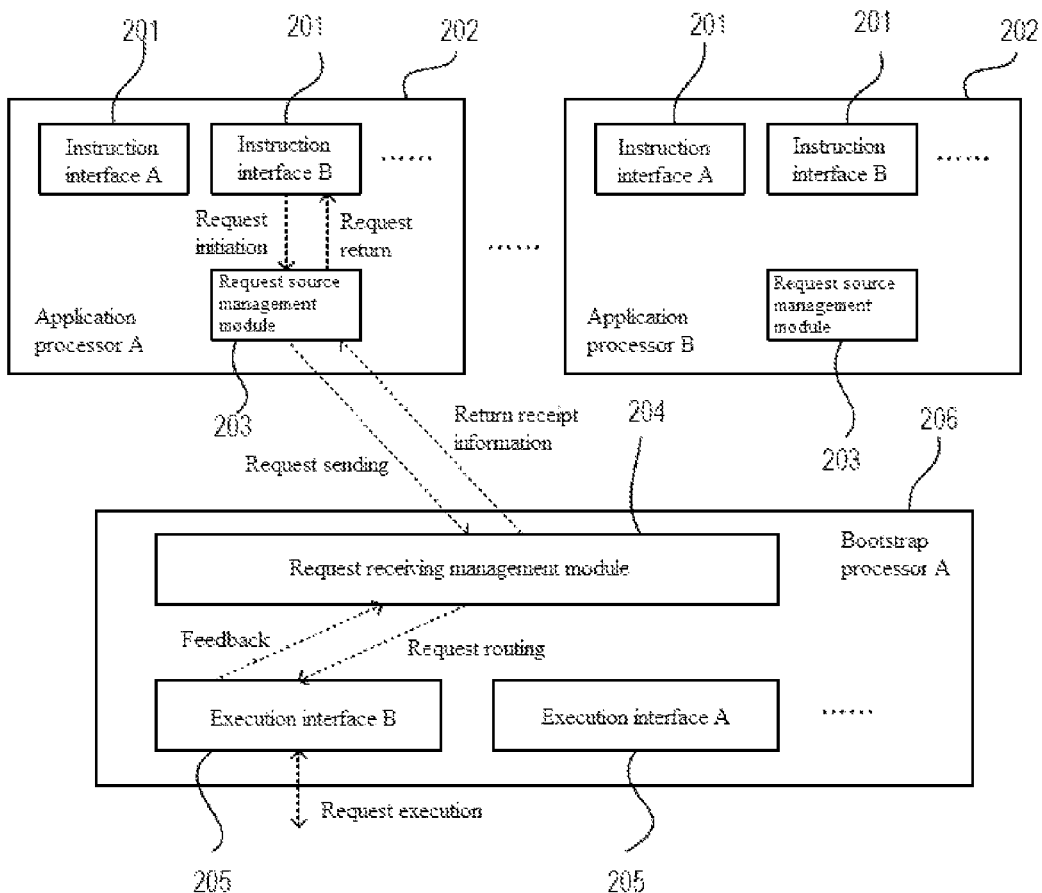
FIG. 2 is a schematic structural diagram of a UEFI multi-core system according to an embodiment of the present application.

Referring to FIG. 1 and FIG. 2, FIG. 1 is a schematic flowchart of steps of a method of underlying drive forwarding according to an embodiment of the present application, and FIG. 2 is a schematic structural diagram of a UEFI multi-core system according to an embodiment of the present application.

In the embodiments shown in FIG. 1 and FIG. 2, the underlying drive forwarding method is configured for underlying drive forwarding of a multi-core system. The multi-core system is implemented based on a UEFI and includes an application processor and a bootstrap processor. The bootstrap processor is provided with an execution interface configured to call underlying hardware. The application processor is configured with an instruction interface corresponding to the execution interface. The underlying drive forwarding method includes the following steps: S11: receiving, by the instruction interface, an operation instruction, generating a request according to the operation instruction, and sending the request to the bootstrap processor; and S12: driving, by the bootstrap processor according to the request, the execution interface corresponding to the instruction interface to execute a corresponding operation.

According to the underlying drive forwarding method in the embodiment shown in FIG. 1, an operation instruction of the application processor is forwarded to the bootstrap processor for execution, and the bootstrap processor directly calls the corresponding execution interface, so as to call the underlying hardware. With this design, the application processor and the bootstrap processor have the same capability to access the underlying hardware, so that the use of the application processor is not restricted and the computing power of the multi-core system is improved.

FIG. 2 also shows a flowchart of a method of underlying drive forwarding. When an operation is required to be executed by the application processor 202, an operation instruction is first sent to an instruction interface 201 of the application processor 202, and the instruction interface 201 initiates a request to a request source management module 203 in the application processor 202 according to the operation instruction. The request includes, but is not limited to, any hardware execution request, such as network sending and receiving or screen display.

In one embodiment, after receiving the request, the request source management module 203 transmits the request to the request receiving management module 204, thereby completing a process of transmitting the request to the bootstrap processor 206 by the application processor 202. The request may be sent by hardware interruption, software interruption or other underlying communication means, provided that request delivery and request response can be satisfied.

Specifically, after sending the request to the bootstrap processor 206, the application processor 202 can wait synchronously or asynchronously depending on a specific requirement of the request.

Since the bootstrap processor 206 itself can drive the underlying hardware to perform a corresponding operation, the request transmitted by the application processor 202 to the underlying hardware through the bootstrap processor 206 can also be directly executed, which increases a computing speed of the multi-core system implemented based on a UEFI.

In one embodiment, prior to the step of driving, by the bootstrap processor 206 according to the request, the execution interface 205 corresponding to the instruction interface 201 to execute a corresponding operation, the underlying drive forwarding method further includes the following step: querying, by the bootstrap processor 206, for whether an execution interface 205 matching the request exists. In this embodiment, if finding that the execution interface 205 matching the request does not exist, the bootstrap processor 206 may return receipt information indicative of failure to the application processor 202, so that the application processor 202 knows that a current operation instruction cannot be responded to and then performs a corresponding alternative operation.

In embodiment, the step of sending the request to the bootstrap processor 206 includes the following step: abstractly encapsulating the request to form a first data packet conforming to a first fixed coding format, the first data packet including an interface number corresponding to a to-be-driven execution interface 205 and operation information corresponding to an operation executed by the to-be-driven execution interface 205.

In one embodiment, the request is abstractly encapsulated in a text or non-text form. For example, the request may be abstractly encapsulated with at least one coding method in ASCII, ISO-8859-1, GB2312, GBK, UTF-8 and UTF-16. Moreover, in one embodiment, a specific packet header is added when the request is encapsulated into the first data packet. The first data packet can be decoded in a specific decoding manner when the bootstrap processor 206 receives the data packet with the packet header. The first fixed coding format defines code bits of the entire first data packet. For example, code bits 14 through 18 are 00111, for indicating that the number of the application processor 202 is 00111. The information may be obtained and parsed by the application processor 202 with the number 00111 in the multi-core system implemented based on a UEFI. The interface number and the operation information can be set in the same way.

In one embodiment, prior to the step of driving, by the bootstrap processor 206 according to the request, the execution interface 205 corresponding to the instruction interface 201 to execute a corresponding operation, the underlying drive forwarding method includes the following steps: parsing the received first data packet to obtain the interface number and operation information included in the first data packet; and driving the corresponding execution interface 205 to execute the corresponding operation according to the interface number and the operation information. Since a bootstrap processor itself is a dedicated underlying drive execution entity, a request of the bootstrap processor 206 to the underlying drive is not restricted. It should be noted that the bootstrap processor 206 can decode the first data packet according to the first fixed coding format to obtain request information in the first data packet.

In this embodiment, if the first data packet further includes an application processor number corresponding to the application processor 202 and/or an instruction interface number in each application processor, the bootstrap processor 206, when receiving the first data packet, may further parse and obtain the application processor number and/or the instruction interface number in each application processor included in the first data packet, so as to correspond to the application processor and the instruction interface during subsequent feedback or operation execution.

In one embodiment, the bootstrap processor 206 first queries for the execution interface 205 according to the decoded content and, after finding the corresponding execution interface 205, directly calls the execution interface 205 for drive execution. In this embodiment, decoding has to restore the content of the request and identify the application processor number of the application processor 202, the execution interface 205 to be called in the request, the operation information included in the request, and so on. It is queried for whether the execution interface 205 corresponding to the instruction interface 201 exists or it is analyzed, according to the operation information, whether the execution interface 205 with corresponding execution capability exists. In this embodiment, if the execution interface 205 corresponding to the request does not exist, the bootstrap processor 206 directly returns failure receipt information indicative of failure of execution to the application processor 202, so that the application processor 202 knows that a current operation instruction cannot be responded to and accordingly performs an alternative operation, for example, performs next operation or hands over the operation to another interface for processing, or the like.

In one embodiment, the first data packet further includes an application processor number corresponding to the application processor 202, and the underlying drive forwarding method further includes the following step: sending, by the bootstrap processor 206, receipt information to the application processor 202. Specifically, the receipt information is sent to the request receiving management module through the execution interface, as shown in FIG. 2. The request receiving management module performs subsequent processing on the receipt information, for example, directly sends the receipt information to the application processor, or sends the receipt information, after encapsulation and packaging, to the application processor. The receipt information includes receipt information indicative of acknowledgment of execution sent when the request is successfully responded to, and receipt information indicative of failure sent when the request is not successfully responded to. The application processor 202 may obtain an execution result of the operation instruction according to the receipt information, which facilitates the application processor 202 to perform next operation or perform an alternative operation when the execution fails, thereby speeding up the running of the multi-core system implemented based on a UEFI.

In one embodiment, when the execution interface 205 sends the receipt information to the request receiving management module 204, the application processor 202 sending the request is searched for at first, which may be implemented through "request routing" in FIG. 2. In one embodiment, the receipt information also includes information returned by the underlying hardware driven by the execution interface 205, which may be implemented by "request execution" in FIG. 2.

In one embodiment, the first data packet may not include the application processor number when the bootstrap processor 206 is not required to send receipt information to the application processor 202 for feedback.

In one embodiment, the request receiving management module processes the receipt information specifically by: abstractly encapsulating the receipt information into a second data packet conforming to a second fixed coding format, including an application processor number corresponding to the application processor 202 sending the request, the interface number corresponding to the to-be-driven execution interface in the request and the operation information corresponding to the operation executed by the to-be-driven execution interface in the request. In addition, a number of the instruction interface sending the request may also be included, so as to determine that the receipt information is finally fed back to the corresponding instruction interface.

The receipt information is abstractly encapsulated into the second data packet conforming to the second fixed coding format, which facilitates the application processor 202 to decode the receipt information in a same decoding manner, which indirectly speeds up the running of the multi-core system implemented based on a UEFI.

In one embodiment, a specific packet header is added when the receipt information is encapsulated into a second data packet. When the application processor 202 receives the data packet with the packet header, the second data packet can be decoded in a specific decoding manner. The second fixed coding format defines code bits of the entire second data packet. For example, code bits 14 through 18 are 00111, for indicating that the number of the application processor 202 is 00111. The information may be obtained and parsed by the application processor 202 with the number 00111 in the multi-core system implemented based on a UEFI.

In one embodiment, the second fixed coding format should be set as needed. Specifically, corresponding code bits can be set in the second fixed coding format according to information needed in the second data packet, so as to indicate different states of different information. Compared with the first fixed coding format, the second fixed coding format includes a code bit representing success or failure of execution, which, in one embodiment, is arranged in a packet header. For example, the packet header includes four code bits. The fourth code bit being 0 means that this is the second data packet of receipt information indicative of failure, and the fourth code bit being 1 means that this is the second data packet of receipt information indicative of successful execution.

In one embodiment, the bootstrap processor 206 sends the second data packet to the application processor 202 by broadcast, and all the application processors 202 can receive the second data packet. Only the application processor 202 corresponding to the application processor number included in the second data packet performs a subsequent decoding operation, so that the second data packet can be sent without constructing a routing relationship between the application processor 202 and the bootstrap processor 206 and without requiring the application processor 202 to verify a routing table when the bootstrap processor 206 sends the second data packet to the application processor 202.

In another embodiment, the bootstrap processor 206 and the application processor 202 constitute a routing network. The bootstrap processor 206 sends the second data packet to the corresponding application processor 202 according to the routing table, instead of sending the second data packet to all the application processors 202, which can prevent a waste of computing resources when other application processors 202 parse a second data packet that does not belong to them.

In fact, the manner in which the bootstrap processor 206 sends the second data packet to the application processor 202 can be selected as needed.

In one embodiment, the application processor 202 receives the second data packet, and the second data packet is received further through the following steps: parsing the second data packet to obtain the interface number included in the second data packet; and finding the execution interface 205 corresponding to the interface number, so as to find an instruction interface 201 corresponding to the execution interface 205 and obtain an execution result of the execution interface 205 through the instruction interface 201. In the embodiment shown in FIG. 2, the application processor 202 obtains the receipt information through the request source management module 203, and after parsing the receipt information, sends the parsed receipt information to the instruction interface 201 corresponding to the execution interface 205.

In one embodiment, the application processor 202 and the bootstrap processor 206 both use the routing table to search for an application processor, an execution interface and a specific operation corresponding to the application processor number, the interface number and the operation information respectively. In one embodiment, the routing table not only includes a correspondence relationship between interface numbers and execution interfaces, but also includes a correspondence relationship between the interface numbers and instruction interfaces 201. In this way, the corresponding instruction interface 201 can be obtained directly through the obtained interface number when the application processor 202 receives the second data packet and parses the second data packet.

In one embodiment, the bootstrap processor 206 also collects execution results and abstracts and encapsulates the execution results. In this case, the second data packet further includes an execution result, and after decoding the second data packet, the application processor 202 finds the instruction interface 201 sending the request and returns an execution result to the instruction interface 201. The operation instruction obtains corresponding drive execution and response.

In another embodiment, the application processor 202 encodes the receipt information according to details of a current request to indicate a request sent by an application processor 202 matching the receipt message. In this case, the application processor number is not required to be encapsulated in the second data packet, which is relatively simple and convenient.

In one embodiment, if the bootstrap processor 206 receives requests from a plurality of application processors 202 at the same time or a current request is being executed while another request is received, operations such as nesting, preemption and parallelism can be performed according to priorities of operations included in the request.

In one embodiment, the underlying drive forwarding method further includes the following steps: dividing, by the bootstrap processor 206, priorities and/or subordinations of a plurality of received requests; and processing, by the bootstrap processor 206, the requests according to the priorities and the subordinations, executing the requests with different priorities in order of priorities from high to low, processing the requests with a same priority in parallel, and nesting the requests with sub ordinations.

Referring to FIG. 2, in this embodiment, a multi-core system implemented based on a UEFI is further provided, including: a bootstrap processor 206 generally connected to underlying hardware in practical use and including a request receiving management module 204 and execution interfaces 205 configured to call the underlying hardware; and an application processor 202 connected to the bootstrap processor 206, including an instruction interface 201 corresponding to the execution interface 205 and a request source management module 203 interacting with the request receiving management module 204. The instruction interface 201 is configured to receive an operation instruction transmitted to the application processor 202 and generate a request according to the operation instruction. The request source management module 203 is configured to forward the request to the request receiving management module 204. The bootstrap processor 206 is configured to call, in response to the request received by the request receiving management module 204, the execution interface 205 corresponding to the instruction interface 201 to execute a corresponding operation.

According to the multi-core system implemented based on a UEFI in the embodiment shown in FIG. 2, the request source management module 203 and the request receiving management module 204 are arranged, an operation instruction of the application processor 202 is forwarded to the bootstrap processor 206 for execution, and the bootstrap processor 206 directly calls the corresponding execution interface 205, so as to call the underlying hardware, so that the use of the application processor 202 is not restricted and the computing power of the multi-core system implemented based on a UEFI can be improved.

One or more application processors 202 may be provided. In the embodiment shown in FIG. 2, an application processor A, an application processor B and so on are included. Each application processor 202 corresponds to an application processor number. One or more instruction interfaces may be provided for each application processor 202. In FIG. 2, each application processor 202 includes an instruction interface A, an instruction interface B and so on. In the embodiment shown in FIG. 2, instruction interfaces 201 provided for a same application processor in the multi-core system implemented based on a UEFI are all identical. In other embodiments, instruction interfaces 201 provided for a same application processor in the multi-core system implemented based on a UEFI may also be different.

In the embodiment shown in FIG. 2, a plurality of execution interfaces 205 are provided, including an execution interface A, an execution interface B and so on. Each execution interface 205 also corresponds to an interface number.

In one embodiment, each execution interface 205 corresponds to at least one instruction interface 201 in one application processor 202. In this way, all calls to the underlying hardware can be realized through the application processor 202. An operation that the execution interface 205 is driven to perform also corresponds to the operation information. This makes it easy for the bootstrap processor to quickly determine a to-be-performed operation based on the operation information in the request. In addition, one execution instruction may not correspond to an instruction interface or one execution interface fails to perform an operation. In this case, failure receipt information indicative of failure of execution is required to be fed back to the application processor 202.

In one embodiment, the request source management module 203 includes a first encapsulation and decoding module. The first encapsulation and decoding module is configured to abstractly encapsulate a to-be-sent request according to a first fixed coding format and generate a first data packet. The first data packet includes an interface number corresponding to a to-be-driven execution interface 205 and operation information corresponding to an operation performed by the to-be-driven execution interface 205. The first encapsulation and decoding module is further configured to decode other received data packets.

In one embodiment, the first encapsulation and decoding module abstractly encapsulates the request with at least one coding method in ASCII, ISO-8859-1, GB2312, GBK, UTF-8 and UTF-16. In one embodiment, a specific packet header is added when the request is encapsulated into a first data packet. When the application processor 206 receives the data packet with the packet header, the first data packet can be decoded in a specific decoding manner. The first fixed coding format defines code bits of the entire first data packet. For example, code bits 14 through 18 are 00111, for indicating that the number of the application processor 202 is 00111. The information may be obtained and parsed by the application processor 202 with the number 00111 in the multi-core system implemented based on a UEFI. The interface number and the operation information can be set in the same way.

In one embodiment, the request receiving management module 204 includes a second encapsulation and decoding module. The second encapsulation and decoding module is configured to decode a first data packet received and abstractly encapsulate, according to a second fixed coding format, information to be sent to the application processor 202 to generate a second data packet. In this embodiment, the first encapsulation and decoding module may decode the second data packet.

In one embodiment, the first data packet further includes the application processor number corresponding to the application processor 202, and the request receiving management module 204 further includes a receipt module connected to the second encapsulation and decoding module and configured to send receipt information to the bootstrap processor 206, including receipt information indicative of acknowledgment of execution sent when the request is successfully responded to, and receipt information indicative of failure sent when the request is not successfully responded to, and the receipt information being encapsulated and abstracted by the second encapsulation and decoding module according to a second fixed coding format. The second encapsulation and decoding module may decode the first data packet.

In this embodiment, the bootstrap processor 206 provides feedback for the received request. Specifically, the receipt module generates receipt information according to a response of the bootstrap processor 206 and sends the receipt information to the application processor through the request receiving management module 204. In one embodiment, the execution interface sends the receipt information to the receipt module in the request receiving management module, and the receipt module in the request receiving management module processes the receipt information to generate the corresponding second data packet.

In one embodiment, a specific packet header is added when the receipt information is encapsulated into a second data packet. When the application processor 202 receives the data packet with the packet header, the second data packet can be decoded in a specific decoding manner. The second fixed coding format defines code bits of the entire second data packet. For example, code bits 14 through 18 are 00111, for indicating that the number of the application processor 202 is 00111. The information may be obtained and parsed by the application processor 202 with the number 00111 in the multi-core system implemented based on a UEFI.

In one embodiment, the request receiving management module 204 further includes a routing table, the routing table including an execution interface-interface number routing portion and a specific operation-operation information routing portion that are configured to search for an execution interface and an execution interface 205 corresponding to each interface number and an operation corresponding to each piece of operation information respectively. In this case, the bootstrap processor 206 finds, according to the routing table, an execution interface 205 to be called in the received request, and directly drives the execution interface 205 to perform a corresponding operation, which is very simple and convenient and requires less operation time.

In one embodiment, the routing table not only includes a correspondence relationship between interface numbers and execution interfaces, but also includes a correspondence relationship between the interface numbers and instruction interfaces 201. In this way, the corresponding instruction interface 201 can be obtained directly through the obtained interface number when the application processor 202 receives the second data packet and parses the second data packet.

Although the present application has been disclosed as above with preferred embodiments, the present application should not be limited by those embodiments. Those skilled in the art may make possible changes and modifications to the present application based on the methods and technical contents disclosed above without departing from the spirit and scope of the present application. Therefore, any simple alterations, equivalent changes and modifications made to the foregoing embodiments based on the technical essence of the present application without departing from the technical solutions of the present application are deemed to fall within the protection scope of the technical solutions in the present application.

What is claimed is:

1. A method of underlying drive forwarding for underlying drive forwarding in a multi-core system, the multi-core system being implemented based on a Unified Extensible Firmware Interface (UEFI) and comprising an application processor and a bootstrap processor, the bootstrap processor being provided with an execution interface configured to call underlying hardware, and the application processor being configured with an instruction interface corresponding to the execution interface, the underlying drive forwarding method comprising the following steps:

receiving, by the instruction interface, an operation instruction, generating a request according to the operation instruction, and sending the request to the bootstrap processor; and driving, by the bootstrap processor according to the request, the execution interface corresponding to the instruction interface to execute a corresponding operation;

wherein the step of sending the request to the bootstrap processor comprises abstractly encapsulating the request to form a first data packet conforming to a first fixed coding format, the first data packet comprising an interface number corresponding to a to-be-driven execution interface and operation information corresponding to an operation executed by the to-be-driven execution interface.

2. The underlying drive forwarding method according to claim 1, prior to the step of driving, by the bootstrap processor according to the request, the execution interface corresponding to the instruction interface to execute a corresponding operation, further comprising the following step:

querying, by the bootstrap processor, for whether an execution interface matching the request exists.

3. The underlying drive forwarding method according to claim 1, prior to the step of driving by the bootstrap processor according to the request, the execution interface corresponding to the instruction interface to execute a corresponding operation, comprising the following steps:

parsing the received first data packet to obtain the interface number and operation information comprised in the first data packet; and driving the corresponding execution interface to execute the corresponding operation according to the interface number and the operation information.

4. The underlying drive forwarding method according to claim 1, wherein the first data packet further comprises an application processor number corresponding to the application processor, and the underlying drive forwarding method further comprises sending, lay the bootstrap processor, receipt information to die application processor, comprising receipt information indicative of acknowledgment of execution sent when the request is successfully responded to, and receipt information indicative of failure sent when the request is not successfully responded to.

5. The underlying drive forwarding method according to claim 4, wherein the receipt information is abstractly encapsulated into a second data packet conforming to a second fixed coding format, comprising an application processor number corresponding to the application processor sending the request, the interface number corresponding to the to-be-driven execution interface in the request and the operation information corresponding to the operation executed by the to-be-driven execution interface in the request.

6. The underlying drive forwarding, method according to claim 5, wherein the application processor receives the second data packet, and the second data packet is received further through the following steps:
  parsing the second data packet to obtain the interface number comprised in the second data packet; and
  finding, according to the interface number, the execution interface corresponding to the interface number, so as to find an instruction interface corresponding to the execution interface and obtain an execution result of the execution interface through the instruction interface.

7. The underlying drive forwarding method according to claim 2, further comprising the following steps:
  dividing, by the bootstrap processor, priorities and/or subordinations of a plurality of received requests; and
  processing, by the bootstrap processor, the requests according to the priorities and the subordinations, executing the requests with different priorities in order of priorities from high to low, processing the requests with a same priority in parallel, and nesting the requests with subordinations.

8. A multi-core system implemented based on a Unified Extensible Firmware interface (UEFI), comprising:
  a bootstrap processor comprising a request receiving management module and execution interfaces configured to call underlying hardware; and an application processor connected to the bootstrap processor, comprising an instruction interface corresponding to the execution interface and a request source management module interacting with the request receiving management module;
  the instruction interface being configured to receive an operation instruction transmitted to the application processor and generate a request according to the operation instruction, the request source management module being configured to forward the request to the request receiving management module, and the bootstrap processor being configured to call, in response to the request received by the request receiving management module, the execution interface corresponding to the instruction interface to execute a corresponding operation;
  wherein the request source management module comprises a first encapsulation and decoding module, the first encapsulation and decoding module being configured to abstractly encapsulate a to-be-sent request according to a first fixed coding format and generate a first data packet, the first data packet comprising an interface number corresponding to a to-be-driven execution interface and operation information corresponding to an operation performed by the to-be-driven execution interface and the first encapsulation and decoding module being further configured to decode other received data packets.

9. The multi-core system implemented based on a UEFI according to claim 8, wherein a plurality of application processors are provided, the application processors have corresponding application processor numbers, a plurality of execution interfaces are provided, the execution interfaces also have corresponding interface numbers, and the operation that the execution interface is driven to perform also corresponds to operation information.

10. The multi-core system implemented based on a UEFI according to claim 9, wherein the request receiving management module comprises a second encapsulation and decoding module, the second encapsulation and decoding module being configured to decode a first data packet received and abstractly encapsulate, according to a second fixed coding format, information to be sent to the application processor to generate a second data packet.

11. The multi-core system implemented based on a UEFI according to claim 10, wherein the first data packet further comprises the application processor number corresponding to the application processor, and the request receiving management module further comprises a receipt module connected to the second encapsulation and decoding module and configured to send receipt information to the bootstrap processor, comprising receipt information indicative of acknowledgment of execution sent when the request is successfully responded to, and receipt information indicative of failure sent when the request is not successfully responded to, and the receipt information being encapsulated and abstracted by the second encapsulation and decoding module according to a second fixed coding format.

12. The multi-core system implemented based on a UEFI according to claim 8, wherein the request receiving management module further comprises a routing table, the routing table comprising an execution interface-interface number routing portion and a specific operation-operation information routing portion that are configured to search for an execution interface and an instruction interface corresponding to each interface number and an operation corresponding to each piece of operation information respectively.

* * * * *